United States Patent
Torii et al.

(10) Patent No.: US 6,626,421 B2
(45) Date of Patent: Sep. 30, 2003

(54) MANUFACTURING METHOD FOR A THROTTLE BODY OF AN INTERNAL COMBUSTION ENGINE AND A RELATED THROTTLE APPARATUS

(75) Inventors: Katsuya Torii, Anjo (JP); Yuichiro Miura, Anjo (JP)

(73) Assignee: Denso Corporation, Aichi (JP)

( * ) Notice: Subject to any disclaimer, the term of this patent is extended or adjusted under 35 U.S.C. 154(b) by 0 days.

(21) Appl. No.: 09/781,194

(22) Filed: Feb. 13, 2001

(65) Prior Publication Data
US 2001/0013586 A1 Aug. 16, 2001

(30) Foreign Application Priority Data

| Feb. 16, 2000 | (JP) | ................ 2000-037897 |
| Mar. 22, 2000 | (JP) | ................ 2000-080154 |
| Feb. 6, 2001 | (JP) | ................ 2001-029544 |

(51) Int. Cl.[7] ................................. F16K 1/22
(52) U.S. Cl. ..................... 251/305; 123/337
(58) Field of Search ............... 251/305, 306; 137/375; 123/337

(56) References Cited

U.S. PATENT DOCUMENTS

| 3,750,698 | A | * | 8/1973 | Walchle et al. ............. 137/375 |
| 4,025,050 | A | * | 5/1977 | Manki et al. ............... 251/306 |
| 4,146,206 | A | * | 3/1979 | Malloy et al. ........... 251/306 X |
| 4,291,863 | A | * | 9/1981 | Gachot .................... 251/306 X |
| 4,407,483 | A | * | 10/1983 | Gachot .................... 251/306 X |
| 4,496,496 | A | * | 1/1985 | Walstra .................... 261/39.6 |
| 4,540,457 | A | * | 9/1985 | LaValley ................ 251/305 X |
| 5,118,078 | A | * | 6/1992 | Younker ..................... 251/160 |
| 5,617,825 | A | * | 4/1997 | Altmann et al. ............ 123/337 |

FOREIGN PATENT DOCUMENTS

| FR | 2687601 | 2/1992 |
| JP | 2000027665 | 7/1998 |
| JP | 11-62637 | 3/1999 |
| JP | 11058450 | 3/1999 |
| JP | 11-173227 | 6/1999 |
| JP | 11-294203 | 10/1999 |
| JP | 11324735 | 11/1999 |
| WO | WO 98/48204 | 10/1998 |

* cited by examiner

Primary Examiner—Gene Mancene
Assistant Examiner—Eric Keasel
(74) Attorney, Agent, or Firm—Nixon & Vanderhye PC (57) ABSTRACT

A resinous throttle body has a pair of bearing portions integrally molded therein. A throttle shaft is rotatably supported by the throttle body via the bearing portions. A throttle valve is securely fixed to the throttle shaft so that the throttle shaft and throttle valve integrally rotate.

8 Claims, 7 Drawing Sheets

MANUFACTURING METHOD FOR A THROTTLE BODY OF AN INTERNAL COMBUSTION ENGINE AND A RELATED THROTTLE APPARATUS

BACKGROUND OF THE INVENTION

The present invention relates to a manufacturing method for a throttle body defining therein an air passage of an internal combustion engine (hereinafter, referred to as engine).

From recent requirements of weight reduction as well as cost reduction, there is known a throttle body whose housing is made of a resin. However, the throttle body is generally configured into a complicated shape with protrusions and recesses for providing bearing members of a throttle shaft and for installing an opening degree sensor.

More specifically, the housing of the throttle body supports both ends of the throttle shaft via the bearing members. The housing has two recesses formed for receiving the bearing members (at portions where the throttle shaft is supported). When the housing including these two recesses (hereinafter, referred to as retaining portions) is formed by resin molding, it is typical that two separate molding dies are prepared for forming these retaining portions.

However, when separate molding dies are used to form the two retaining portions, it is necessary to accurately adjust axial centers of these molding dies. Otherwise, axial centers of the bearing members resulting through the resin molding operation will not agree with each other. For example, even if the throttle shaft can be inserted into the bearing portions, disagreement of the axial centers of the bearing members will undesirably increase a rotational torque of the throttle shaft. This will generate an excessive drive loss when the throttle shaft is driven. Furthermore, requiring high accuracy in the setting of the separate molding dies will increase the manufacturing cost.

Furthermore, even if setting of the separate molding dies is accurately done, the axial centers of the bearing members may disagree with each other due to product tolerance of the bearing members themselves.

Unexamined Japanese patent publication No. 11-173227 proposes a manufacturing method for a throttle body. According to this method, a housing of the throttle body is formed by a composite material with a matrix of synthetic resin. Retaining portions of a throttle shaft are formed independent of the housing. The retaining portions are connected to a cylindrical portion of the housing by welding or the like so that deformation of the intake passage can be prevented.

According to this manufacturing method, the above-described molding dies are not used for forming the retaining portions of the throttle shaft. However, this conventional technique will encounter similar problems. For example, the separately formed retaining portions may not be accurately connected to the cylindrical portion of the housing. In this case, the axial centers of the bearing members disagree with each other. Furthermore, even if connection of the retaining portions with the cylindrical portion of the housing is accurately done, the axial centers of the bearing members may disagree with each other due to the tolerances of respective bearing members.

Furthermore, the above-described conventional technique requires a step of forming the retaining portions of the throttle shaft independent of the cylindrical portion of the housing and a step of connecting the retaining portions to the cylindrical portion. Thus, the total number of required manufacturing steps increases and the manufacturing cost increases.

Furthermore, the present invention relates to a throttle apparatus adjusting an intake air amount of the engine.

According to a conventional throttle apparatus, a disklike valve member is rotatably provided to adjust an intake air amount flowing in an intake passage. There is a throttle body whose main body is made of a resin for the purpose of reducing the weight of the throttle apparatus. The above-discussed unexamined Japanese patent publication 11-173227 discloses the throttle apparatus having a resinous or resin-made throttle body and bearing portions of a throttle shaft. The bearing portions are made of a resin material different from that of the throttle body and connected by welding to the throttle body.

However, the above-described conventional throttle apparatus requires the throttle body and two bearing portions which are separately formed. Thus, a total number of the parts increases. Furthermore, the above-described conventional throttle apparatus requires a step of connecting the bearing portions to the throttle body by welding or the like. Thus, the total number of manufacturing steps increases and the manufacturing cost increases.

SUMMARY OF THE INVENTION

In view of the foregoing problems of the prior art, a primary object of the present invention is to provide a resinous or resin-made throttle body for an engine throttle apparatus which is free from disagreement of axial centers of bearing members supporting both ends of a throttle shaft.

To accomplish the above and other related objects, the present invention provides a manufacturing method for an engine throttle body comprising a step of inserting a correcting shaft member into bearing members which rotatably support a throttle shaft fixing a valve member controlling an opening degree of an air passage, a step of placing the bearing members with the correcting shaft member inserted therein in a molding space of a molding die and integrally molding by a resin material a cylindrical portion of the throttle body defining the air passage and retaining portions supporting the bearing members, a step of, after finishing the molding step of the throttle body, extracting the correcting shaft member from the bearing members, a step of inserting the throttle shaft into the bearing members, and a step of fixing the valve member to the throttle shaft.

With this arrangement, it becomes possible to support the throttle shaft by the bearing members whose axial centers accurately agree with each other.

Furthermore, integrally forming the cylindrical portion and the retaining portions makes it possible to eliminate a step of connecting the cylindrical portion with the separately formed retaining portions. Thus, it becomes possible to facilitate the manufacturing process and reduce the manufacturing cost.

According to the manufacturing method for an engine throttle body of the present invention, it is preferable that the bearing member is constituted by an anti-friction bearing. This enhances the effect of preventing the valve member from freezing due to icing phenomenon or from sticking due to accumulation of deposition, compared with a case where both of the bearing members are constituted by the sleeve bearing. Furthermore, in the molding step of the throttle body, an axial end of the anti-friction bearing is covered by a covering member. Thus, it becomes possible to conceal the rotational portion of the bearing against the resin material so as to assure smooth rotation of the bearing.

According to the manufacturing method for an engine throttle body of the present invention, it is preferable that the covering member comprises a cylindrical wall covering a cylindrical side surface of the bearing. Thus, it becomes possible to conceal the rotational portion of the bearing against the resin material so as to assure smooth rotation of the bearing. Furthermore, a locking means is provided on the cylindrical wall for preventing rotation of the bearing. Thus it becomes possible to prevent the bearing from rotating in the resin during the molding operation. Thus, the bearing does not shift in the shaft thrust direction.

According to the manufacturing method for an engine throttle body of the present invention, it is preferable that the throttle shaft has a smaller outer diameter at a portion accommodated in the cylindrical portion and a larger outer diameter at other portions accommodated in the retaining portions. Thus, it becomes possible to eliminate frictional contact between the throttle shaft and the cylindrical portion. The throttle shaft smoothly rotates without causing frictional loss. Accordingly, the opening degree of the valve member can be controlled properly. Adjustment of air flow amount in the air passage can be performed adequately.

According to the manufacturing method for an engine throttle body of the present invention, it is preferable that the correcting shaft member is extracted in a predetermined direction in the extracting step of the correcting shaft member. Thus, the axial opposed end of the retaining portion can be closed. The rotational portion of the throttle shaft or the like is not exposed to the outside of the throttle body. Accordingly, it becomes possible to enhance the airtightness and fluid-tightness of the bearing member. No special plug or the like is required. Therefore, it becomes possible to simplify the arrangement, reduce the total number of parts constituting the throttle body, and reduce the manufacturing cost.

Moreover, in view of the foregoing problems of the prior art, the present invention has an object to provide a throttle apparatus capable of reducing the total number of parts and also capable of reducing the weight.

To accomplish the above and other related objects, the present invention provides a throttle apparatus having a throttle body made by a resin. At least one axial end of a throttle shaft is directly supported by the throttle body. This makes it possible to reduce the number of the bearing members which need to be separately produced for supporting the throttle shaft. The weight of the throttle apparatus reduces compared with a case where the throttle shaft is supported by a complicated bearing such as anti-friction bearing. Furthermore, the bearing structure for the throttle shaft becomes simple. The total number of parts reduces. Accordingly, the assembling of the throttle apparatus becomes easy and the manufacturing cost decreases.

Preferably, both axial ends of the throttle shaft are directly supported by the throttle body. This arrangement makes it possible to omit all of the bearing members which need to be separately produced for supporting the throttle shaft. Accordingly, the weight of the throttle apparatus reduces and the total number of parts reduces. Furthermore, the assembling of the throttle apparatus becomes easy and the manufacturing cost decreases.

Preferably, a coating is applied to the throttle shaft at the axial end region directly supported by the throttle body. This makes it possible to reduce frictional resistance between the throttle body and the throttle shaft.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF PREFERRED EMBODIMENTS

Hereinafter, a plurality of embodiments of the present invention will be explained with reference to attached drawings.

First Embodiment

Figure 2:
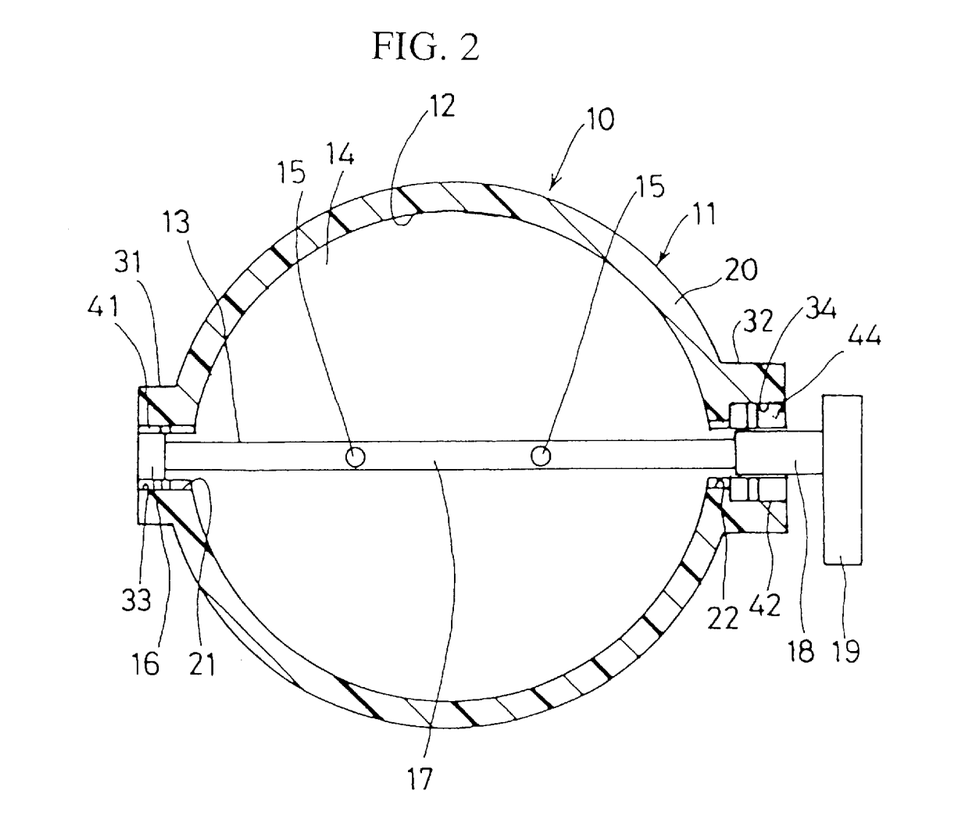
FIG. 2 is a cross-sectional view showing the throttle body in accordance with the first embodiment of the present invention.

FIG. 2 shows a throttle body of an engine in accordance with a first embodiment of the present invention.

A throttle body 10 shown in FIG. 2 is attached to an inlet side of a surge tank (not shown) constituting part of an intake passage of an engine.

The throttle body 10 comprises a housing 11, a throttle shaft 13, and a throttle valve 14 serving as a valve member adjusting an intake air amount of the engine. The housing 11 consists of a cylindrical portion 20 and retaining portions 31 and 32 which are integrally formed as a resin product through resin molding with a shaping die.

The cylindrical portion 20 has a smooth and simplified cylindrical shape with no protrusions or recessed portions formed on the inner cylindrical surface thereof. An inside hollow space of the cylindrical portion 20 defines an intake passage 12. The throttle valve 14 adjusts an opening degree of the intake passage 12. The throttle valve 14 is fixed to the throttle shaft 13 by means of screws 15. The throttle shaft 13 is rotatably supported in the throttle body 10. More specifically, the cylindrical portion 20 has through-holes 21 and 22 opened at opposed portions corresponding to the retaining portions 31 and 32. The axial ends of the throttle shaft 13 are rotatably inserted in the through-holes 21 and 22. The clearance between the inner cylindrical portion 20 and the throttle valve 14 must be accurately maintained. To this end, roundness and inner diameter of the cylindrical portion 20 are very accurately administrated in the manufacturing process of the cylindrical portion 20.

The throttle shaft 13 has a first large-diameter portion 16, a smaller-diameter portion 17, and a second large-diameter portion 18. The first large-diameter portion 16 is provided at one end of the throttle shaft 13 and supported by a later-described bearing member 41. The smaller-diameter portion 17 is interposed between the first large-diameter portion 18 and the second large-diameter portion 16. The throttle valve 14 is securely fixed to the smaller-diameter portion 17 by means of the screws 15. The second large-diameter portion 18 is connected to the smaller-diameter portion 17 at one end and connected to a lever 19 at the other end. A later-described bearing member 42 supports the second large-diameter portion 18. The outer diameter of the first large-diameter portion 16 is substantially the same as that of the second large 30 diameter portion 18. The smaller-diameter portion 17 has an outer diameter smaller than those of the larger-diameter portions 16 and 18. In other words, the throttle shaft 13 has a smaller outer diameter at a portion accommodated in the cylindrical portion 20 and a larger outer diameter at other portions accommodated in the retaining portions 31 and 32. The lever 19, connected to the second large-diameter portion 18, is provided at the other end of the throttle shaft 13. The lever 19 is connected to one end of a cable (not shown). The other end of the cable is connected to an accelerator pedal (not shown).

Each of the retaining portions 31 and 32 protrudes from the outer surface of the cylindrical portion 20 in the radial outward direction. The retaining portions 31 and 32 have bores 33 and 34 formed therein. The bearings members 41 and 42, supporting the axial ends of the throttle shaft 13, are placed in the bores 33 and 34, respectively. The bores 33 and 34 are continuous or communicate with the through-holes 21 and 22, respectively. The bearing member 41 is a sleeve bearing held by the inside wall of the bore 33 for rotatably supporting the first large-diameter portion 16 of the throttle shaft 13. The bearing member 42 is constituted by an anti-friction bearing 44, such as a ball bearing or a needle bearing, held by the inside wall of the bore 34 for rotatably supporting the second large-diameter portion 18 of the throttle shaft 13.

Figure 1:
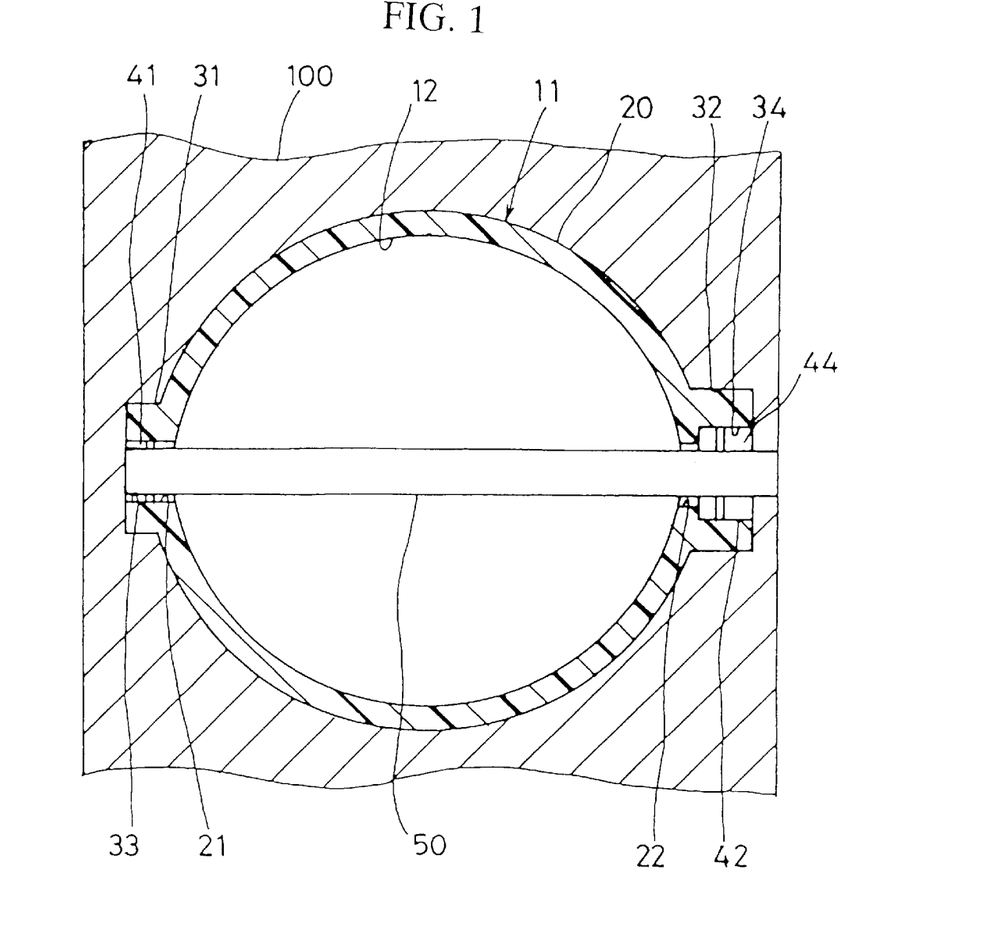
FIG. 1 is a cross-sectional view showing a molding process of a housing, explaining a manufacturing method for a throttle body in accordance with a first embodiment of the present invention.

Next, a manufacturing method of the throttle body 10 will be explained with reference to FIGS. 1 and 2.

1: Prior to the molding operation of the housing 11, a worker inserts the correcting pin 50 into the bearing members 41 and 42 as shown in FIG. 1. Then, the worker places an integrated assembly of the correcting pin 50 and the bearing members 41 and 42 to a predetermined position in a molding space of a resin molding die 100. Alternatively, it is possible that the worker places the correcting pin 50 and the bearing members 41 and 42 separately in the molding space of the resin molding die 100. In this case, the worker first places the bearing members 41 and 42 in position, and next inserts the correcting pin 50 into the bearing members 41 and 42 placed in the molding space of the resin molding die 100. Thereafter, the cylindrical portion 20, the retaining portions 31 and 32 are molded together into an integrated unit. The correcting pin 50, serving as a correcting shaft member, has a uniform outer diameter and entirely extends in the axial direction from the first large-diameter portion 16 to the second large-diameter portion 18 as shown in FIG. 2. Accordingly, the outer diameter of the correcting pin 50 is larger than that of the smaller-diameter portion 17 of the throttle shaft 13.

2: After finishing the molding operation of the housing 11, the worker extracts the correcting pin 50 from the bearing members 41 and 42 and then press fits the oil sealing (not shown) into the bores 33 and 34 of the retaining portions 31 and 32.

3: Thereafter, the worker inserts the throttle shaft 13 into the through-holes 21 and 22 of the cylindrical portion 20 so that the first large-diameter portion 16 and the second large-diameter portion 18 of the throttle shaft 13 are supported by the bearing members 41 and 42, respectively. Then, the worker engages the throttle valve 14 with the throttle shaft 13 and fixes them by means of the screws 15.

Next, an operation of the throttle body 10 manufactured through the above-described steps 1 to 3 will be explained.

When a driver depresses the accelerator pedal, the cable shifts by an amount corresponding to a depression amount of the accelerator pedal. The lever 19 and the throttle shaft 13 rotate together in response to the shift movement of the cable. The throttle valve 14 rotates correspondingly with the same rotational angle as that of the throttle shaft 13. Intake air corresponding to the opening degree of the throttle valve 14 flows in the intake passage 12 and is introduced into a cylinder of the engine due to pumping function of an engine piston.

As described above, the throttle shaft 13 has a smaller outer diameter at the portion accommodated in the cylindrical portion 20 and a larger outer diameter at other portions accommodated in the retaining portions 31 and 32. Thus, it is possible to eliminate frictional contact between the throttle shaft 13 and the resinous or resin-made housing 11. The throttle shaft 13 smoothly rotates without causing frictional loss. Accordingly, the opening degree of the throttle valve 14 can be controlled properly. Adjustment of air flow amount in the intake passage 12 can be performed adequately.

Furthermore, the bearing member 42 is constituted by an anti-friction bearing 44. This enhances the effect of preventing the throttle valve 14 from freezing due to icing phenomenon or from sticking due to accumulation of deposition, compared with a case where both of the bearing members 41 and 42 are constituted by the sleeve bearing.

According to the above-described first embodiment of the present invention, the correcting pin 50 is inserted into the bearing members 41 and 42. Then, the cylindrical portion 20 and the retaining portions 31 and 32 are integrally molded by a resin material. After finishing the molding operation, the correcting pin 50 is extracted from the bearing members 41 and 42. Then, the throttle shaft 13 is inserted into the bearing members 41 and 42. Finally, the throttle valve 14 is fixed to the throttle shaft 13.

Performing the resin molding operation by using the correcting pin 50 temporarily inserted into the bearing members 41 and 42 is advantageous in that the bearing members 41 and 42 are accurately held in the retaining portions 31 and 32 so that the axial center of the bearing member 41 agrees with the axial center of the bearing member 42 throughout the molding operation.

Accordingly, it becomes possible to accurately equalize the axial centers of the bearing members supporting the both ends of the throttle shaft 13. If the axial centers of the bearing members 41 and 42 disagree with each other, the throttle shaft 13 will be subjected to a large rotational torque caused by this disagreement. The increased rotational torque induces a drive loss of a motor or the like which drives the throttle shaft 13.

Furthermore, according to the first embodiment, the cylindrical portion 20 and the retaining portions 31 and 32 are integrally molded. If the cylindrical portion 20 is formed separately from the retaining portions 31 and 32, a step of connecting the cylindrical portion 20 to the retaining portions 31 and 32 is additionally required. Thus, the first embodiment provides an excellent manufacturing method capable of reducing the total number of manufacturing steps of the throttle body 10. The manufacturing process becomes easy and the manufacturing cost reduces.

Second Embodiment

Figure 3:
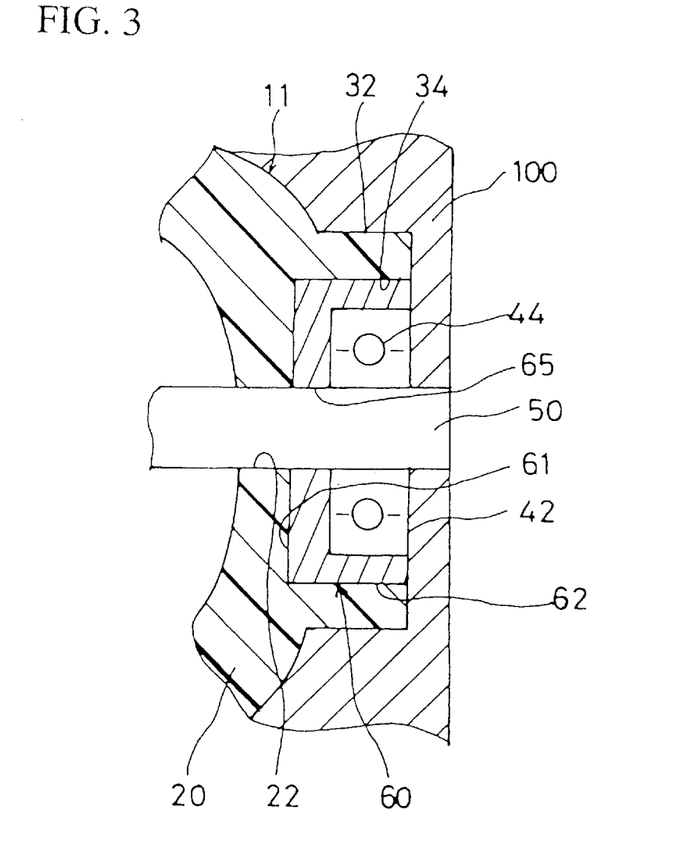
FIG. 3 is an enlarged cross-sectional view showing an essential part of the molding process of a housing, explaining a manufacturing method for a throttle body in accordance with a second embodiment of the present invention.
Figure 4:
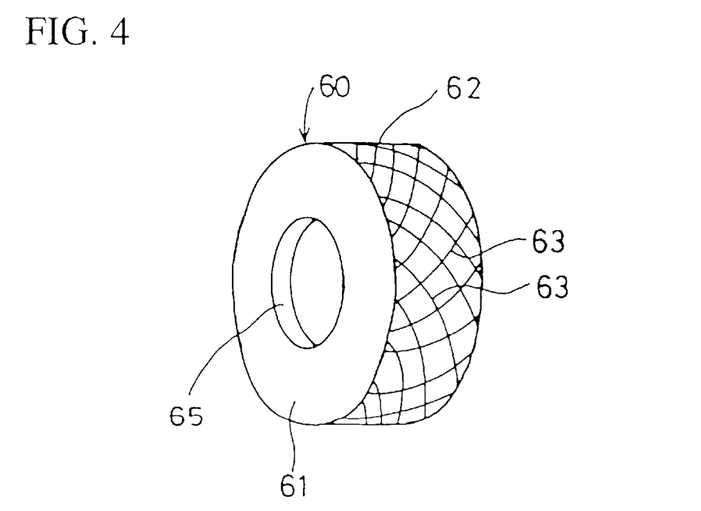
FIG. 4 is a perspective view showing a collar in accordance with the second embodiment of the present invention.

FIGS. 3 and 4 cooperatively show a second embodiment of the present invention. The second embodiment differs from the first embodiment in that a cover member is provided to cover an axial inner end and a cylindrical side surface of the anti-friction bearing 44 shown in FIG. 1. The components identical with those disclosed in the first embodiment are denoted by the same reference numerals.

According to the second embodiment, prior to the molding operation of the housing 11, the worker attaches a collar 60 to the anti-friction bearing 44 so that the axial inner end and the cylindrical side wall of the anti-friction bearing 44 are covered by the collar 60 as shown in FIG. 3. Then, the worker inserts the correcting pin 50 into the bearing member 42 and the collar 60. Subsequently, the worker integrally molds the housing 11.

The collar 60, serving as a cover member, has a cylindrical shape with a side wall 61 and a cylindrical wall 62 as shown in FIG. 4. The side wall 61 has an circular opening 65 whose inner diameter is substantially identical with or slightly larger than the outer diameter of the correcting pin 50. Accordingly, the side wall 61 covers the axial inner end of the bearing 44. The cylindrical wall 62 has grooves 63 formed on an outer surface thereof which serve as knurling capable of preventing the bearing 44 from rotating in the resin during the molding operation. In other words, the collar 60 has a locking means for preventing the rotation of the bearing. The cylindrical wall 62 covers a cylindrical side surface of the bearing 44. After finishing the molding operation of the housing 11, the worker performs the same steps as the above-described steps 2 and 3 explained in the first embodiment, thereby manufacturing the engine throttle body.

According to the second embodiment, the axial inner end of the bearing 44 is covered by the side wall 61 of the collar 60 before starting the molding operation. Thus, it becomes possible to conceal the rotational portion of the bearing 44 against the resin material so as to assure smooth rotation of the bearing 44.

According to the second embodiment, the cylindrical side surface of the bearing 44 is covered by the cylindrical wall 62 of the collar 60 before starting the molding operation. Thus, it becomes possible to conceal the rotational portion of the bearing 44 against the resin material so as to assure smooth rotation of the bearing 44.

Furthermore, according to the second embodiment, the knurling is provided on the outer surface of the cylindrical wall 62 of the collar 60 so as to prevent the bearing 44 from rotating in the resin during the molding operation. Thus, the bearing 44 does not shift in the shaft thrust direction.

Third Embodiment

Figure 5:
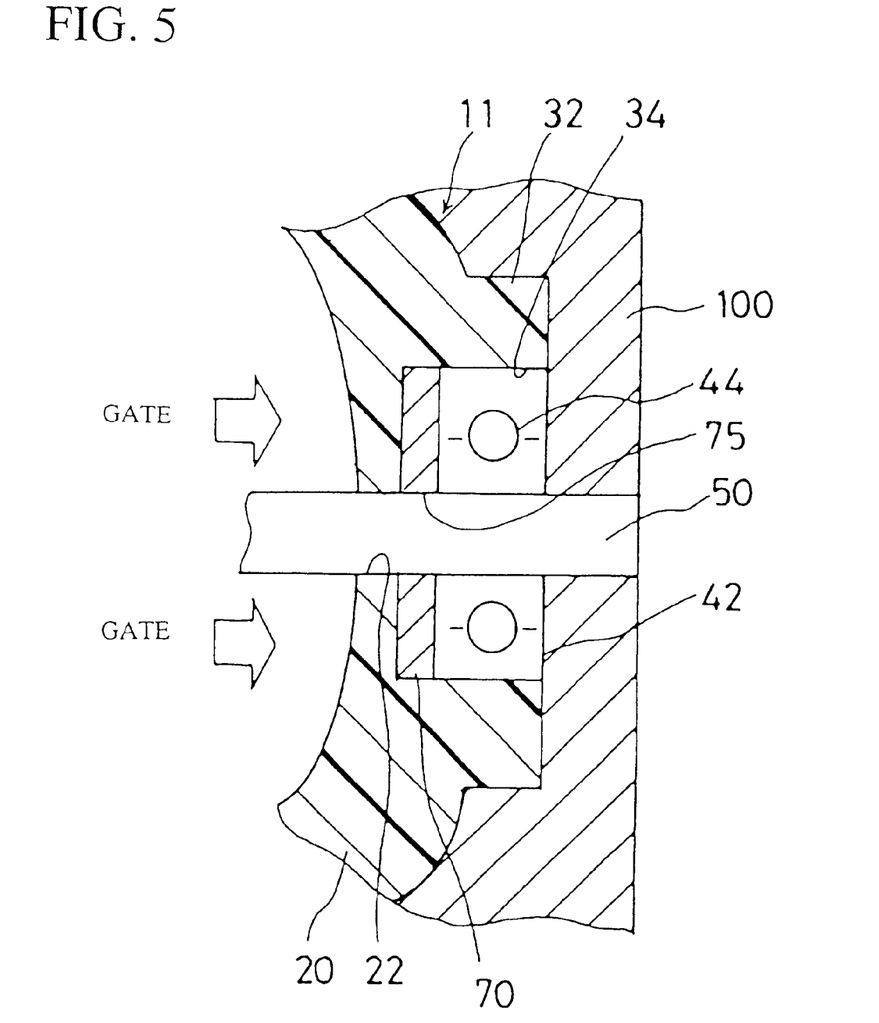
FIG. 5 is an enlarged cross-sectional view showing an essential part of the molding process of a housing, explaining a manufacturing method for a throttle body in accordance with a third embodiment of the present invention.

FIG. 5 shows a third embodiment of the present invention. The third embodiment differs from the second embodiment in that the collar 60 shown in FIG. 3 is modified so as to cover only the axial inner end of the anti-friction bearing 44. The components identical with those disclosed in the second embodiment are denoted by the same reference numerals.

According to the third embodiment, prior to the molding operation of the housing 11, the worker attaches a collar 70 to the anti-friction bearing 44 so that the axial inner end of the anti-friction bearing 44 is covered by the collar 70 as shown in FIG. 4. Then, the worker inserts the correcting pin 50 into the bearing member 42 and the collar 70. Subsequently, the worker integrally molds the housing 11 with a gate placed at a side opposed to the bearing 44. The molding pressure acts on the collar 70 so that the collar 70 airtightly contacts with the axial inner end of the bearing 44. Thus, it becomes possible to conceal the rotational portion of the bearing 44 against the resin material. The collar 70, serving as a cover member, has a disk shape with a circular opening 75 whose inner diameter is substantially identical with or slightly larger than the outer diameter of the correcting pin 50.

According to the third embodiment, the axial inner end of the bearing 44 is covered by the collar 70 before starting the molding operation. Thus, it becomes possible to conceal the rotational portion of the bearing 44 against the resin material so as to assure smooth rotation of the bearing 44.

Fourth Embodiment

Figure 6:
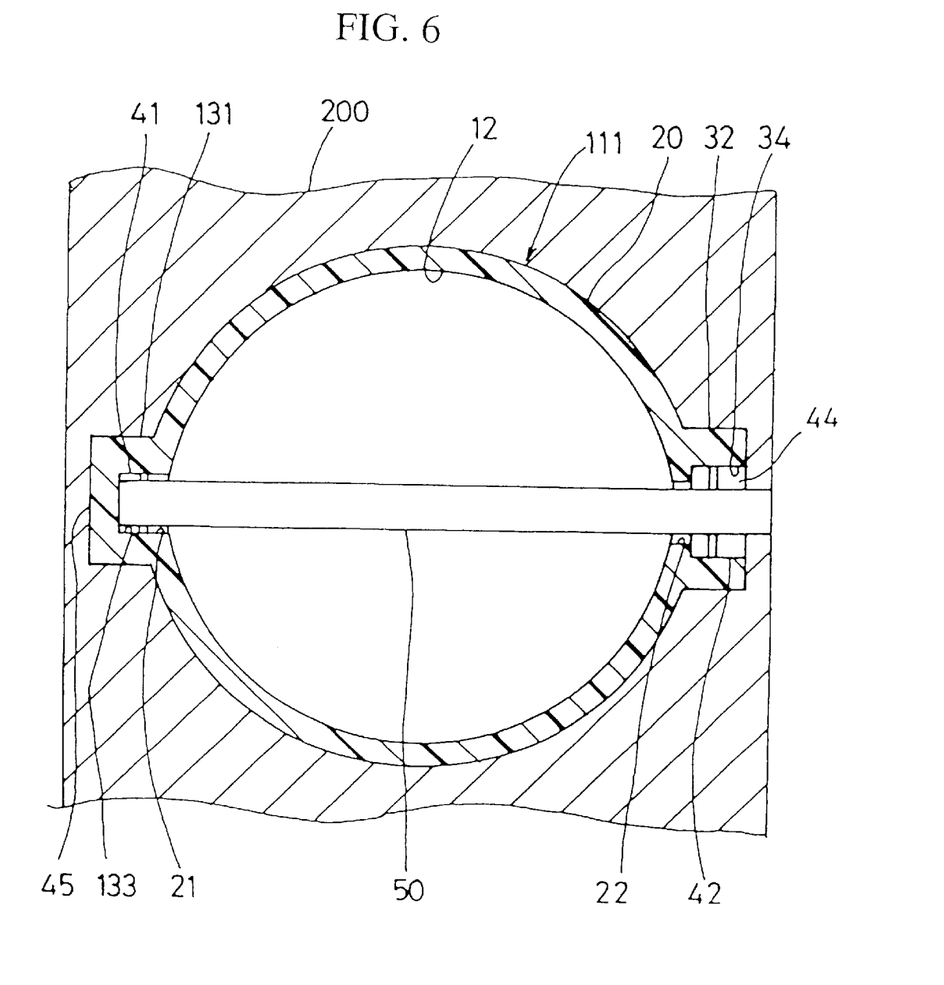
FIG. 6 is a cross-sectional view showing a molding process of a housing, explaining a manufacturing method for a throttle body in accordance with a fourth embodiment of the present invention.
Figure 7:
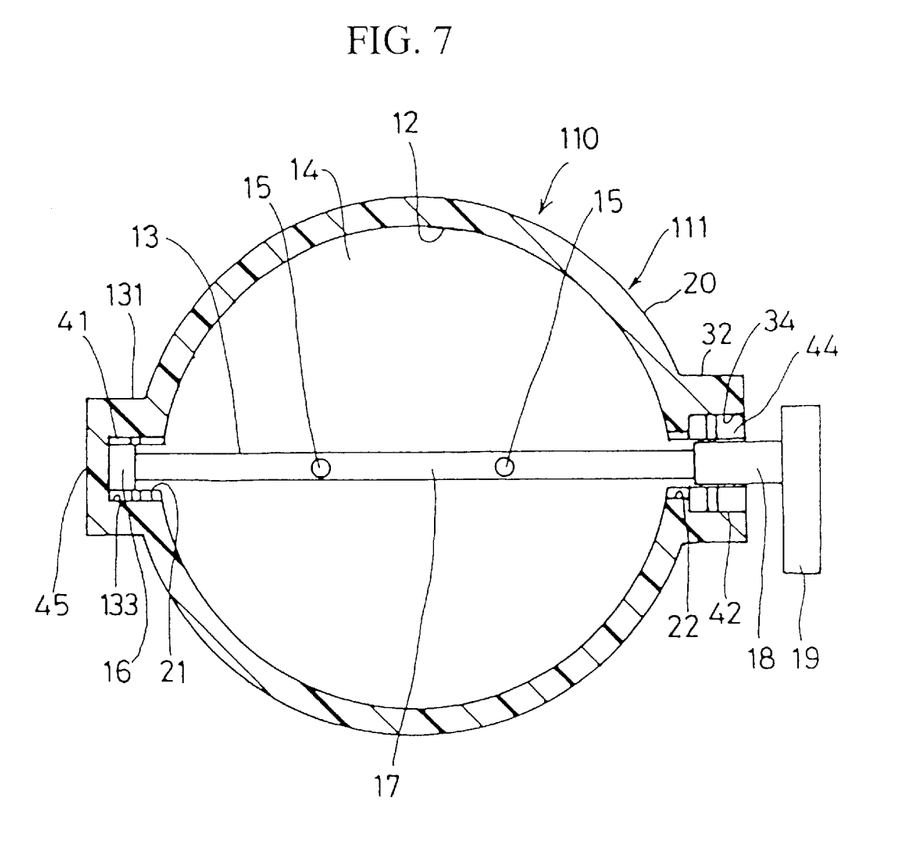
FIG. 7 is a cross-sectional view showing the throttle body in accordance with the fourth embodiment of the present invention.

FIGS. 6 and 7 cooperatively show a fourth embodiment of the present invention. The fourth embodiment differs from the first embodiment in that the retaining portion 31 shown in FIGS. 1 and 2 is modified into a sealed type. The components identical with those disclosed in the first embodiment are denoted by the same reference numerals.

According to the fourth embodiment, as shown in FIG. 7, a retaining portion 131 has a bore 133. The bearing member 41, supporting one axial end of the throttle shaft 13, is placed in the bore 133. The hollow space 133 is continuous or communicates with the through-hole 21. The bore 133 is closed by a sealing portion 45 at an axial outer end.

Prior to the molding operation of a housing 111, the worker inserts the correcting pin 50 into the bearing members 41 and 42 as shown in FIG. 6. Then, the worker places an integrated assembly of the correcting pin 50 and the bearing members 41 and 42 to a predetermined position in a molding space of a resin molding die 200. Alternatively, it is possible that the worker first places the bearing members 41 and 42 in position, and next inserts the correcting pin 50 into the bearing members 41 and 42 placed in the molding space of the resin molding die 200. Thereafter, the cylindrical portion 20, the retaining portions 131 and 32 are molded together into an integrated unit.

After finishing the molding operation of the housing 111, the worker extracts the correcting pin 50 from the bearing members 41 and 42 in the right direction, i.e., in a predetermined one direction. Then, the worker press fits the oil sealing (not shown) into the bore 34 of the retaining portion 32.

Thereafter, the worker performs the same step as the above-described step 3 explained in the first embodiment, thereby manufacturing the engine throttle body 110.

According to the above-described forth embodiment, the correcting pin 50 is extracted from the bearing members 41 and 42 in the predetermined one direction opposed to the retaining portion 131. Thus, the axial outer end of the retaining portion 131 can be closed by the sealing portion 45. The rotational portion of the throttle shaft 13 or the like is not exposed to the outside of the throttle body. Accordingly, it becomes possible to enhance the airtightness and fluid-tightness of the bearing member. No special plug or the like is required. Therefore, the fourth embodiment provides an excellent manufacturing method capable of simplifying the arrangement, reducing the total number of parts constituting the throttle body, and reducing the manufacturing cost.

According to the above-described first and fourth embodiments, one bearing member 41 is constituted by a sleeve bearing and the other bearing member 42 is constituted by the anti-friction bearing 44. However, the present invention is not limited to this combination. It is therefore possible to constitute both of the bearing members 41 and 42 by the same sleeve bearing or by the same anti-friction bearing.

Furthermore, according to the first and fourth embodiments, the throttle shaft 13 has a stepped shape consisting of the first large-diameter portion 16, the smaller-diameter portion 17, and the second large-diameter portion 18. However, the present invention is not limited to this configuration. It is therefore possible to configure the throttle shaft 13 so as to extend entirely in the axial direction with a uniform outer diameter.

Fifth Embodiment

Hereinafter, a fifth embodiment of the present invention will be explained with reference to an attached drawing.

The fifth embodiment is characterized in that the bearing members are removed to solve the conventional problems derived from the disagreement of the axial centers of the bearing members which are formed independent of the throttle body.

Figure 8:
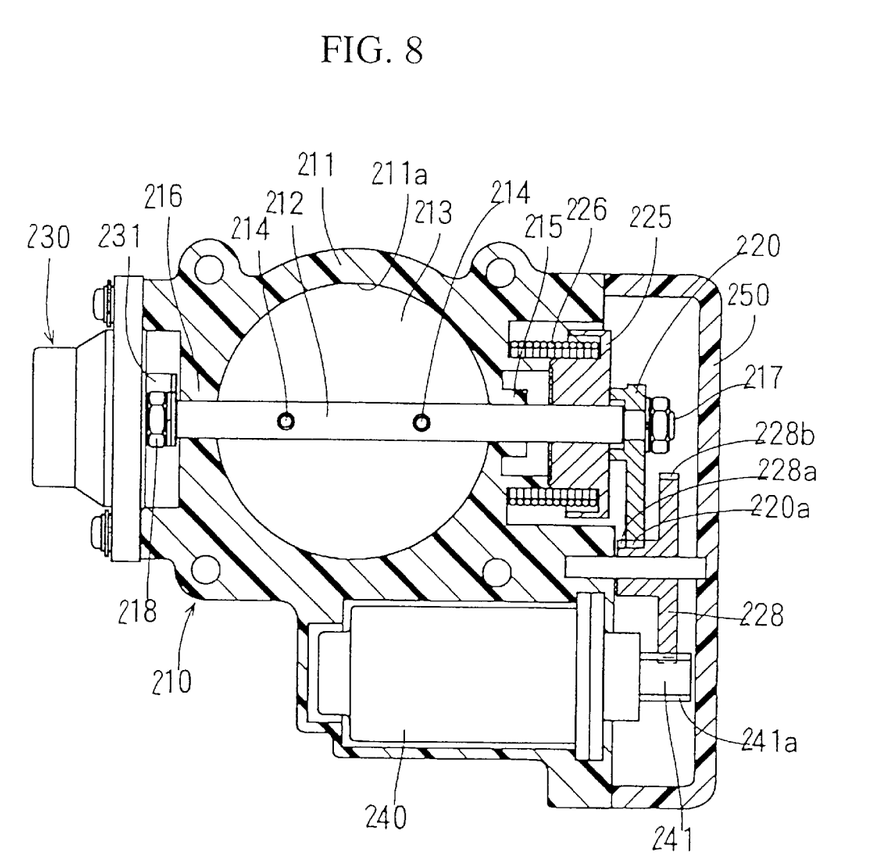
FIG. 8 is a cross-sectional view showing an arrangement of a throttle apparatus in accordance with a fifth embodiment of the present invention.

FIG. 8 shows a preferred embodiment of the present invention.

A throttle opening degree of a throttle apparatus 210 is electronically controlled based on engine operating conditions, such as accelerator opening degree, engine rotational speed, engine load, cooling water temperature or the like. A throttle body 211 has an intake passage 211a formed therein. The throttle apparatus 210 adjusts an intake air amount flowing in this intake passage 211a. The throttle body 211 is an integrally formed resin-made product. FIG. 8 shows a fully closed condition of the throttle apparatus 210.

The throttle body 211 has a pair of bearing portions 215 and 216 which are radially opposed across the intake passage 211a. A throttle shaft 212 has axial ends supported by the bearing portions 215 and 216. Thus, the throttle shaft 212 is rotatably supported by the throttle body 211 via the bearing portions 215 and 216. The throttle shaft 212 is a metal product made of SIOC or the like. A valve member 213 is configured into a disk shape and is securely fixed to the throttle shaft 212 by means of screws 214. Thus, the throttle shaft 212 and the valve member 213 integrally rotate.

A throttle gear 220 is formed into a semicircular plate and is securely fixed to the throttle shaft 212 by means of a bolt 217. An engaging member 225 is a circular member. The engaging member 225 is coupled with the throttle gear 220 at a side opposing to the throttle gear 220 and rotates together with the throttle gear 220. A spring 226 has one end fixed to the throttle body 211 and the other end fixed to the engaging member 225. The spring 226 resiliently urges the throttle gear 220 and the engaging member 225 to close the valve member 213. The engaging member 225 is stopped by a full-close stopper (not shown) provided in the throttle body 211 when the valve member 213 is fully closed. Thus, the full-close stopper restricts the rotation of the valve member 213 in the closing direction. The position of the full-close stopper agrees with a fully closed position in terms of the throttle opening degree.

An intermediate gear 228 includes a small-diameter teethed portion 228a and a large-diameter teethed portion 228b. The small-diameter teethed portion 228a meshes with a teethed portion 220a of the throttle gear 220. The large-diameter teethed portion 228b meshes with a teethed portion 241a of a motor gear 241 of a motor 240.

The motor 240, serving as a driving means, is for example a DC motor which is installed on the throttle body 211. When the motor 240 rotates, rotation of the motor 240 is transmitted to the throttle shaft 212 and the valve member 213 via the intermediate gear 228 and the throttle gear 220. Thus, the throttle opening degree is adjustable in accordance with rotation of the motor 240. A cover 250 covers all of the gears and the motor 240.

A rotational angle sensor 230 is attached to the other side of the throttle body 211 opposed to the throttle gear 220 across the intake passage 211a. A sensor lever 231 is securely fixed to the throttle shaft 212 by means of a bolt 218. The sensor lever 231 rotates together with the throttle shaft 212. The rotational angle sensor 230 detects a throttle opening degree based on the rotation of the sensor lever 231.

Although not shown, the throttle opening degree detected by the rotational angle sensor 230 is sent to an engine control apparatus (hereinafter, referred to as ECU). ECU controls a current value supplied to the motor 240 based on the engine operating conditions, such as engine rotational speed, engine load, accelerator opening degree, cooling water temperature or the like, as well as based on the detection signal of the rotational angle sensor 230. The motor 240 controls the throttle opening degree in accordance with the current value determined by ECU. When the motor 240 is driven, its rotational force acts on the throttle gear 220 against the urging force of the spring 226 so that the valve member 213 rotates in the opening direction.

According to the above-described embodiment, both of axial ends of the throttle shaft 212 are directly supported by the resinous throttle body 211. This arrangement makes it possible to omit all of the bearing portions which need to be separately produced independent of the throttle body. Accordingly, the weight of the throttle apparatus 210 reduces compared with a case where the throttle shaft 212 is supported by the complicated bearings such as anti-friction bearing. Furthermore, the bearing structure of the throttle shaft 212 becomes simple and the total number of parts reduces. Thus, the assembling of the throttle apparatus 210 becomes easy and the manufacturing cost decreases.

Although the above-described embodiment discloses the throttle shaft 212 whose both ends are directly supported by the throttle body 211, it is possible to directly support only one end of the throttle shaft 212 by the throttle body 211. In this case, it is preferable to support the other end of the throttle shaft 212 by an anti-friction bearing, such as a ball bearing and a needle bearing, at a side where the rotational force of the motor 240 is applied or a side where the pulling force of an accelerator wire is applied.

Furthermore, it is preferable to apply a Teflon® coating to the throttle shaft 5 212 at the axial end region directly supported by the throttle body 211. Alternatively, it is preferable to form a nitride layer at the axial end region of the throttle shaft 212. This is effective to reduce the frictional resistance between the throttle shaft and the throttle body. The Teflon® coating can be replaced by a resin coating. It is also possible to form the throttle shaft by a resin. It is also possible to apply a lubrication such as grease to the region directly supported by the throttle body.

The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A throttle apparatus comprising:

a resinous throttle body having an intake passage therein;

a valve member rotatably provided in said intake passage to adjust an intake air flowing in said intake passage; and a throttle shaft rotating together with said valve member, wherein said throttle body includes a bearing portion as part of said throttle body, said bearing portion being integrally molded in a single molding die with said throttle body by using the same resin material for forming said bearing portion and said throttle body, said throttle shaft has a central portion for fixing said valve member and axial end portions elongated outward from said central portion, and at least one of said axial end portions of said throttle shaft is directly supported by said bearing portion of said throttle body.

2. The throttle apparatus in accordance with claim 1, wherein said throttle body includes two bearing portions as part of said throttle body being integrally molded in said single molding die by using the same resin material for forming said two bearing portions and said throttle body, and both of said axial end portions of said throttle shaft are directly supported by said bearing portions of said throttle body.

3. The throttle apparatus in accordance with claim 1, wherein said throttle shaft is a metallic member and a coating is applied to said throttle shaft at a limited region corresponding to said at least one of said axial end portions directly supported by said bearing portion of said throttle body, so as to reduce a frictional resistance between said throttle shaft and said throttle body.

4. The throttle apparatus in accordance with claim 1, further comprising a throttle opening mechanism connected to said throttle shaft for regulating a rotational movement of said throttle shaft.

5. The throttle apparatus in accordance with claim 1, wherein said bearing portion is simultaneously molded with said throttle body by using said same resin material commonly used for forming said bearing portion and said throttle body.

6. The throttle apparatus in accordance with claim 1, wherein said two portions are simultaneously molded with said throttle body by using said same resin material commonly used for forming said two bearing portions and said throttle body.

7. A throttle apparatus comprising:

a resinous throttle body having an intake passage therein;

a valve member rotatably provided in said intake passage to adjust an intake air flowing in said intake passage; and a throttle shaft rotating together with said valve member, wherein said throttle body includes a bearing portion as part of said throttle body, said bearing portion being integrally and simultaneously molded in a single molding die with said throttle body by using the same resin material for forming said bearing portion and said throttle body, said throttle shaft has a central portion for fixing said valve member and axial end portions elongated outward from said central portion, and at least one of said axial end portions of said throttle shaft is directly supported by said bearing portion of said throttle body.

8. The throttle apparatus in accordance with claim 7, wherein said throttle body includes two bearing portions as part of said throttle body being integrally and simultaneously molded in said single molding die by using the same resin material for forming said two bearing portions and said throttle body, and both of said axial end portions of said throttle shaft are directly supported by said bearing portions of said throttle body.

* * * * *